United States Patent
Roberts

(10) Patent No.: US 6,876,691 B1
(45) Date of Patent: Apr. 5, 2005

(54) METHOD OF THE RECEIVER FOR FREQUENCY ACQUISITION IN A FREQUENCY HOPPING SYSTEM

(75) Inventor: David K. Roberts, Horley (GB)

(73) Assignee: Koninklijke Philips Electronics N.V., Eindhoven (NL)

(*) Notice: Subject to any disclaimer, the term of this patent is extended or adjusted under 35 U.S.C. 154(b) by 583 days.

(21) Appl. No.: 09/585,827

(22) Filed: Jun. 1, 2000

(30) Foreign Application Priority Data

Jun. 2, 1999 (GB) .............................................. 9912774

(51) Int. Cl.$^7$ .............................................. H04B 1/713
(52) U.S. Cl. ................................................... 375/133
(58) Field of Search .......................... 375/130, 132–137, 375/260, 345, 347; 455/166.1, 166.2, 161.1; 370/329

(56) References Cited

U.S. PATENT DOCUMENTS

| | | | | |
|---|---|---|---|---|
| 5,339,331 A | * | 8/1994 | Beauchamp et al. | ........ 375/137 |
| 5,471,503 A | * | 11/1995 | Altmaier et al. | .............. 375/20 |
| 5,663,957 A | * | 9/1997 | Dent | .......................... 370/347 |

OTHER PUBLICATIONS

Waseem W S Jibrail et al: "Performance Analysis of Two Serial–Search Acquistion Schemes for FH Spread Signals" International Journal of Electronics, GB, Taylor and Francis, LTD. London, vol. 75, No. 6, Dec. 1, 1993, pp. 1083–1097.

* cited by examiner

Primary Examiner—Kevin M. Burd
(74) Attorney, Agent, or Firm—Jack D. Slobod; Dicran Halajian

(57) ABSTRACT

A frequency hopping system comprises a transmitting station and a receiving station, both stations storing a frequency hopping sequence comprising a predetermined sequence of N frequencies, where N is an integer greater than 2. In order for the receiving station to acquire synchronization with the transmitter which is continuously hopping through the sequence of frequencies, the receiver initiates a search by tuning to one of the N frequencies and checking if that frequency corresponds to the currently transmitted frequency during that hop period. If it does not correspond, the receiver eliminates the phase of hopping sequence associated with that frequency and tunes to another of the N frequencies with the exception of the next frequency in the eliminated phase and checks for correspondence. If there is not correspondence then the phase of the hopping sequence associated with that frequency is also eliminated from the search. The search is continued with the progressive elimination from the search of those phases found to be unacceptable until a phase which matches the transmitted phase is found and the search is terminated.

9 Claims, 4 Drawing Sheets

METHOD OF THE RECEIVER FOR FREQUENCY ACQUISITION IN A FREQUENCY HOPPING SYSTEM

FIELD OF THE INVENTION

The present invention relates to a method of, and receiver for, frequency acquisition in a frequency hopping system.

BACKGROUND OF THE INVENTION

The present invention has particular, but not exclusive, application in frequency hopping systems operating in the ISM bands in which strict rules apply, including a rule that a transmitter must continuously frequency hop. Although a receiver will store the hopping sequence of N frequencies, where N is greater than 2, for example, 50 or 75, when it switches-on it will not know in advance which one of the hopping frequencies is currently being transmitted. However, once it has detected one hopping frequency in the sequence, the receiver can synchronise with the phase of the sequence and will be able to track the sequence of hopping frequencies using a frequency synthesiser.

Various techniques are known in the art for a receiver to acquire synchronisation. In one technique the receiver tunes to one of the N frequencies and remains on that frequency until hop synchronisation is acquired or N hop periods have elapsed. In the latter event the receiver tries another of the N frequencies. This technique can lead to long acquisition times if the chosen frequency is suffering interference.

U.S. Pat. No. 5,471,503 discloses a frequency hopping system having N frequency channels or hops and assumes error correction techniques which allow a transmission to be recovered if no more than e segments out of the N are corrupted. In implementing receiver acquisition, the receiver continuously scans the first, p, (where $1 \leq p \leq e+1$), channels and tests each channel for the existence of a transmission. A scan time for each frequency of the p channels is substantially less than the time to receive a segment. If a transmission is detected then the receiver synchronises itself with the transmitted sequence This cited method requires the receiver to be capable of scanning the p channels at a higher rate than the frequency hopping rate which is not always desirable in communications apparatus.

OBJECT OF THE INVENTION

As object of the present invention is to obtain frequency acquisition at the frequency hopping rate.

SUMMARY OF THE INVENTION

According to one aspect of the present invention there is provided a method of frequency acquisition in a frequency hopping system in which a transmitter continuously frequency hops through a predetermined sequence of N frequencies, where N is an integer greater than 2, and in which a tunable receiver stores the predetermined sequence of N frequencies. The method comprises the receiver testing phases of the hopping sequence at the transmitter hopping rate and eliminating from the search those phases which are unacceptable until a phase which matches the transmitted phase is found and terminating the search.

According to a second aspect of the present invention there is provided a method of frequency acquisition in a frequency hopping system in which a transmitter continuously frequency hops through a predetermined sequence of N frequencies, where N is an integer greater than 2, and in which a tunable receiver stores the predetermined sequence of N frequencies. The method comprises the receiver tuning to one of said N frequencies and monitoring the selected frequency for a hop period, and if the selected frequency corresponds to the transmitted frequency, assuming that it has frequency acquisition and terminating the search, but if it does not correspond, selecting another of said N frequencies, with the exception of the frequency in the hopping sequence adjacent the previously selected frequency.

According to a third aspect of the present invention there is provided a receiver for use in a frequency hopping system in which a transmitter continuously frequency hops through a predetermined sequence of N frequencies, where N is an integer greater than 2. The receiver comprises means for storing representations of the frequencies in said predetermined sequence of N frequencies, means for selecting the representations, means responsive to the selection of a representation of one of said N frequencies for tuning the receiver, means for monitoring the selected frequency for a hop period, and if the selected frequency corresponds to the transmitted frequency, assuming that it has frequency acquisition, but if it does not correspond, the selecting means selects a representation of another of said N frequencies with the exception of the frequency in the hopping sequence adjacent the previously selected frequency.

The present invention is based on the realisation that when a receiver is selecting a frequency to try and achieve acquisition, if a first frequency does not correspond to a frequency in the hopping sequence which is currently being transmitted, then it is pointless selecting as a second or subsequent frequency one(s) which follow the first frequency in the respective phase of the hopping sequence. Thus by imposing constraints on the selection of the frequencies to avoid phases of the hopping sequence which it is known in advance will not correspond, a faster acquisition can be achieved.

The selection of the frequencies may be done on a random basis or on the basis of received signal strength measurements.

If the one or first selected frequency has a frequency f(i) then in selecting the second frequency f(j) the constraint $j \neq i+1$ applies. The selection of a third frequency f(k) is subject to the constraints $k \neq i+2$ and $k \neq j+1$. As an example if the frequency hopping sequence is f(1), f(2), f(3) ... f(N−1), f(N), and the transmitter is about to transmit f(6), for example, and the receiver selects (i)=2 and listens, then no transmission will be detected during the hop period. Thus when choosing f(j), the above constraint prevents (j)=3 because it is known that f(2) did not correspond in the first hop period, f(3) will not correspond in the second hop period. A similar consideration applies to the selection of other sequences, thus there is a progressive elimination of the phases of the frequency hopping sequence which do not work.

BRIEF DESCRIPTION OF THE DRAWINGS

The present invention will now be described, by way of example, with reference to the accompanying drawings, wherein:

FIGS. 4A, 4B and 4C are notional phases of the hopping sequence associated with the receiving station selecting different frequencies in successive hop periods to try and achieve acquisition.

In the drawings the same reference numerals have been used to identify the same features.

DETAILED DESCRIPTION OF THE DRAWINGS

Figure 1:
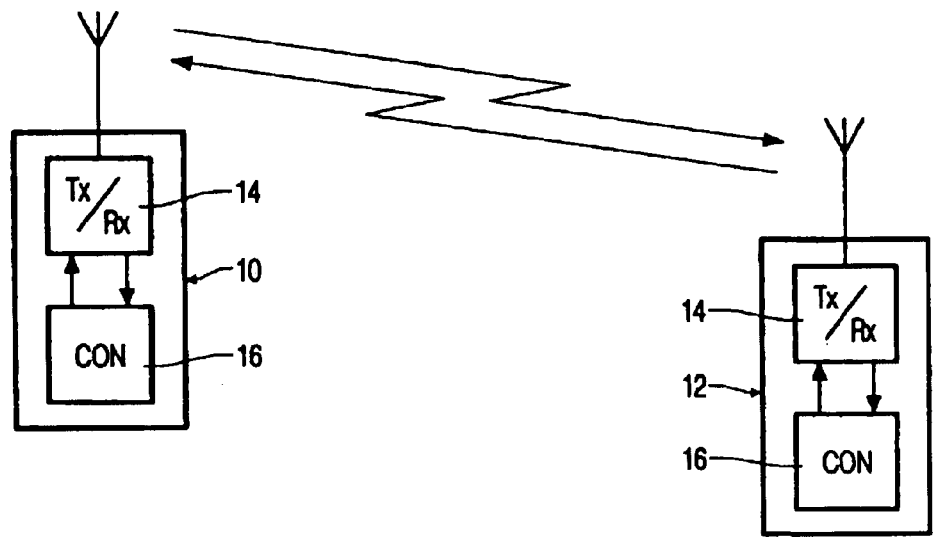
FIG. 1 is a block schematic diagram of a frequency hopping communication system.

The frequency hopping communication system which may be a cordless telephone system or a domestic two-way control system comprises a primary station 10 which for convenience will be regarded to as a generally fixedly sited station and at least one secondary station 12 which for convenience will be regarded as a mobile or portable station. Depending on the network architecture, there may be several primary stations 10 which are coupled by landline or radio link to a system controller (not shown) or the primary stations are programmed to act collectively as a virtual system controller. Each type of station includes a transceiver 14 whose operation is controlled by a controller 16. Communications between the stations 10, 12 are by a frequency hopping scheme in which a frequency band is divided into a plurality of N frequency channels, where say N=50 or 75 channels, and a hopping sequence f(1), f(2) ... f(N−1), f(N) is devised based on a suitable pseudo-random algorithm. In order for one of the stations to be able to receive transmissions from the other of the stations, the receiving station, which is storing the details of the frequency hopping sequence, has to achieve frequency acquisition, that is to synchronise its hopping phase with that of the transmitting station.

Figure 2:
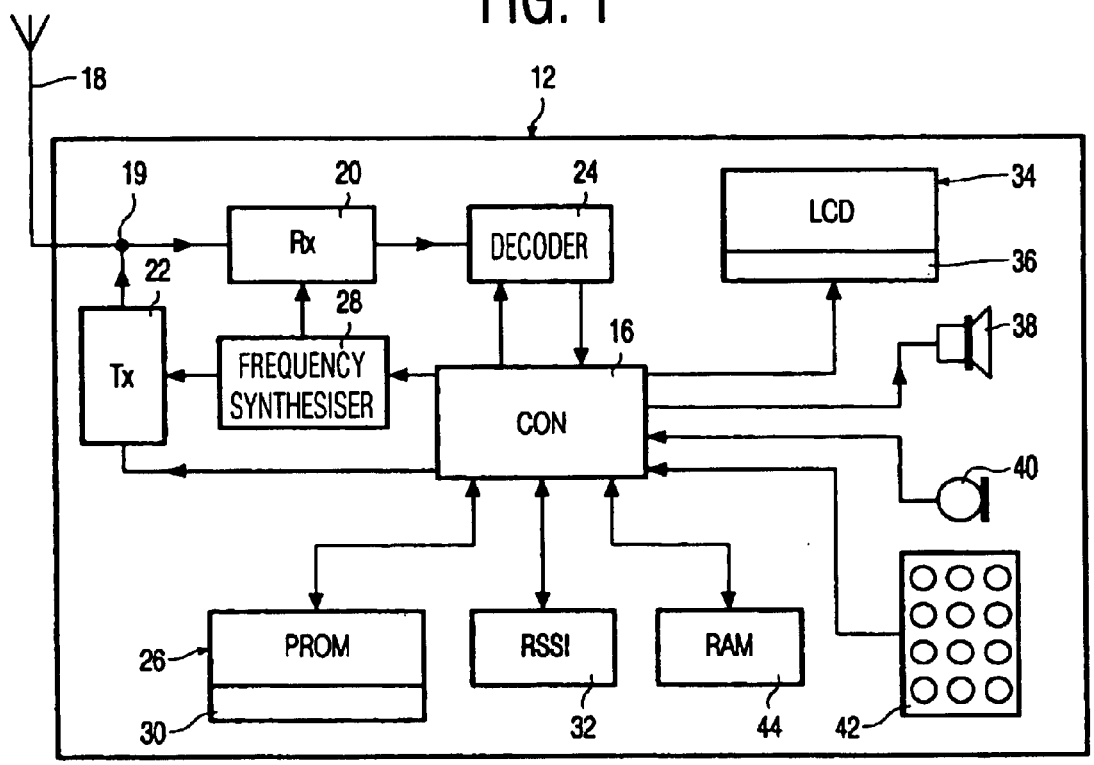
FIG. 2 is the block schematic diagram of a secondary station.

FIG. 2 is a block schematic diagram of a secondary station 12. An antenna 18 is coupled to a junction 19 which is connected on the one hand to a receiver 20 and on the other hand to a transmitter 22. A decoder 24 is connected between an output of the receiver 20 and an input to a controller (CON) 16 which controls the operation of the secondary station 12 in accordance with a pre-stored program in a PROM 26. A frequency synthesiser 28 is coupled to the receiver 20 and the transmitter 22 and its frequency is switchable in accordance with data supplied by the controller 16. The data, which is stored in an area 30 of the PROM 26, may take any suitable form, for example frequencies or data relating to the various divider ratios which enable the frequency synthesiser to hop through the frequencies in either the required sequence, once acquisition has been achieved, or in accordance with an algorithm, to be described, to enable the secondary station to synchronise with the phase of the transmitted hopping sequence as received at the antenna 18. The algorithm may be a nominally random algorithm, one based on received signal strength measurements (RSSI) stored in a store 32 or one based on other information such as channel quality, for example, error rate, information.

For the sake of completeness the secondary station 12 further, includes an LCD panel 34 with a driver 36, a loudspeaker 38, a microphone 40, a keypad 42, and a message memory or RAM 44, all connected to the CON 16.

Figure 3:
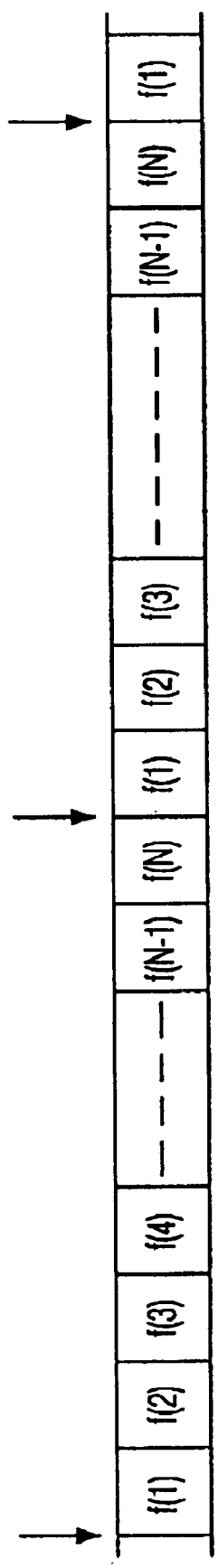
FIG. 3 is a timing diagram showing a transmitter hopping continuously.

Referring to FIG. 3, the transmitter frequency hopping sequence shown between the downwardly pointing arrows comprises frequencies identified as f(1), f(2), ... f(N−1), f(N). When operating at an ISM frequency, it is a rule that the hopping sequence is transmitted continuously. The assignment of actual frequencies to this numerical sequence is done in accordance with a suitable pseudo-random algorithm, of which many examples are known in the art and accordingly will not be described in the present specification as it is not critical to the understanding of the invention.

A receiver on switching-on or recovering from say a fade needs to acquire synchronisation with the transmitting station. As mentioned previously the receiver has the hopping sequence embedded in its memory 30 but it needs to synchronise its phase with that of the transmitted hopping sequence.

Figures 4A, 4B, 4C:
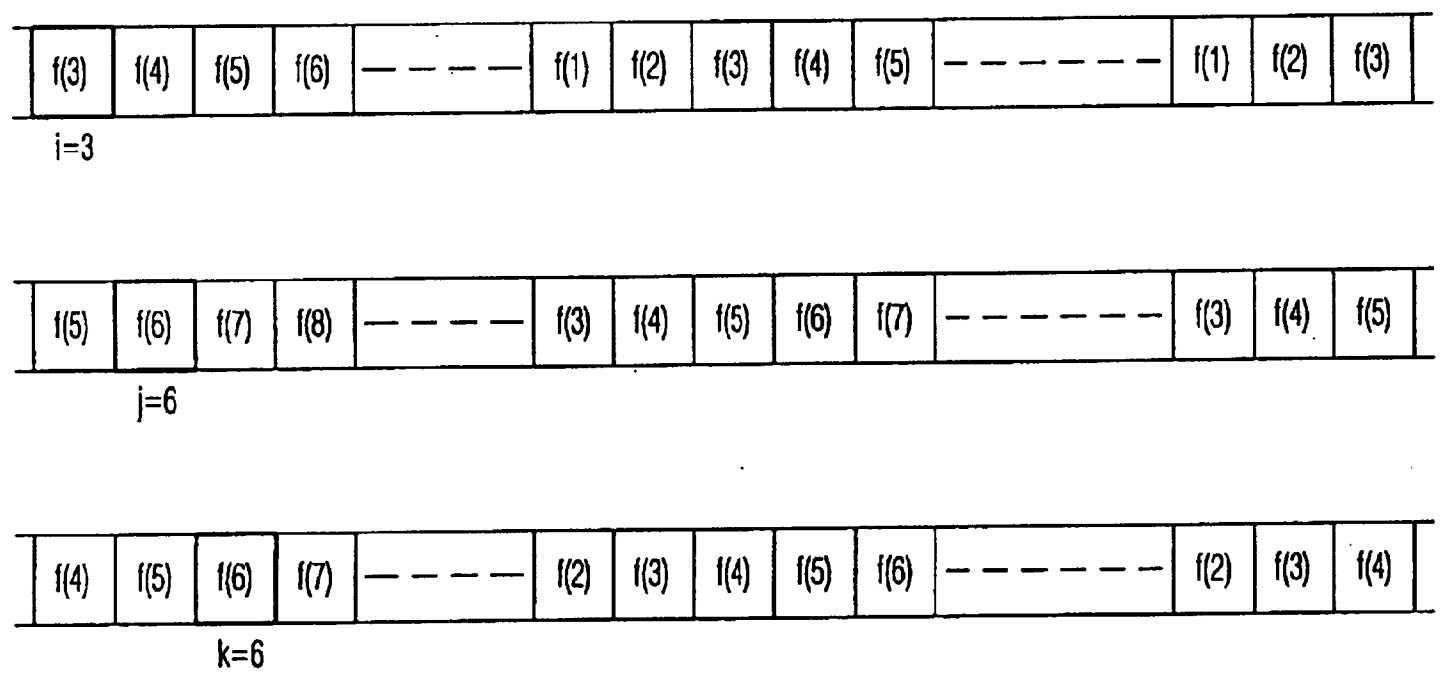

FIGS. 4A to 4C explain the principles behind the method in accordance with the present invention which, subject to interference in the respective frequency channels, is anticipated to achieve acquisition within a maximum of N hopping periods but more typically it is estimated that it will be within N/2 hopping periods. The method is based on the fact that the phase of the transmitted hopping sequence begins with frequency f(1) and is followed by frequency f(2) and so on until frequency f(N), thus if the receiver selects say frequency f(3) for the first hop period then there will not be correspondence because the phase of the notional sequence would be f(3), ... f(N), f(1), f(2) rather than that as shown in FIG. 3. Thus it is out-of-phase. When the receiver selects the next following frequency, if it selected f(4) for the second hop period, it would duplicate the previous notional phase which the, receiver had already learnt was unacceptable. Thus it should be constrained from choosing f(4). Similar considerations apply to any other selected frequency which does not provide acquisition. This will become apparent from the following numerical example.

1. Referring to FIG. 4A the receiver chooses a frequency f(i)=3 on which it will listen for one hop period. The choice of frequency may be random, or it may be influenced by received signal strength measurements, or other information. By choosing f(i)=3, the notional phase is f(3), ... f(N), f(1), f(2).

2. The receiver does not hear the transmitter on this frequency so it hops to another frequency f(j)=6. This frequency may be chosen as in the, previous stage, but it is subject to the constraint that j≠i+1. This therefore embodies the knowledge that one phase of the hop sequence has already been unsuccessfully tried. By choosing f(j)=6, the notional phase is f(5) f(N) ... f(4).

3. If the receiver again does not hear the transmitter within a hop period, the receiver hops to another new frequency f (k)=6. This time the choice of frequency is subject to two constraints: k≠i+2 and k≠j+1. This embodies the knowledge that two phases of the hop sequence have now been unsuccessfully tried. By choosing f (k)=6, the notional phase is f (4), ... f(N) ... f(3).

4. The steps continue until either the wanted message from the transmitter is heard, or there is only one frequency available to be chosen. This happens when N−1 phases of the hop sequence have been tried. In the absence of interference, the maximum acquisition time is N hop periods as each of the N phases of the hop sequence are tried once each.

5. If, due to interference, synchronisation has not been acquired after N hop periods, then the whole process is repeated.

If some of the hop frequencies are suffering interference, then this algorithm should achieve faster acquisition than the procedure involving the receiver remaining on certain frequencies. This is because this algorithm allows the acquisition procedure to utilise many different frequencies. This is increased frequency diversity avoids the problem of wasting time listening on frequencies on which there is too much interference for the transmitter to be heard.

Figure 5:
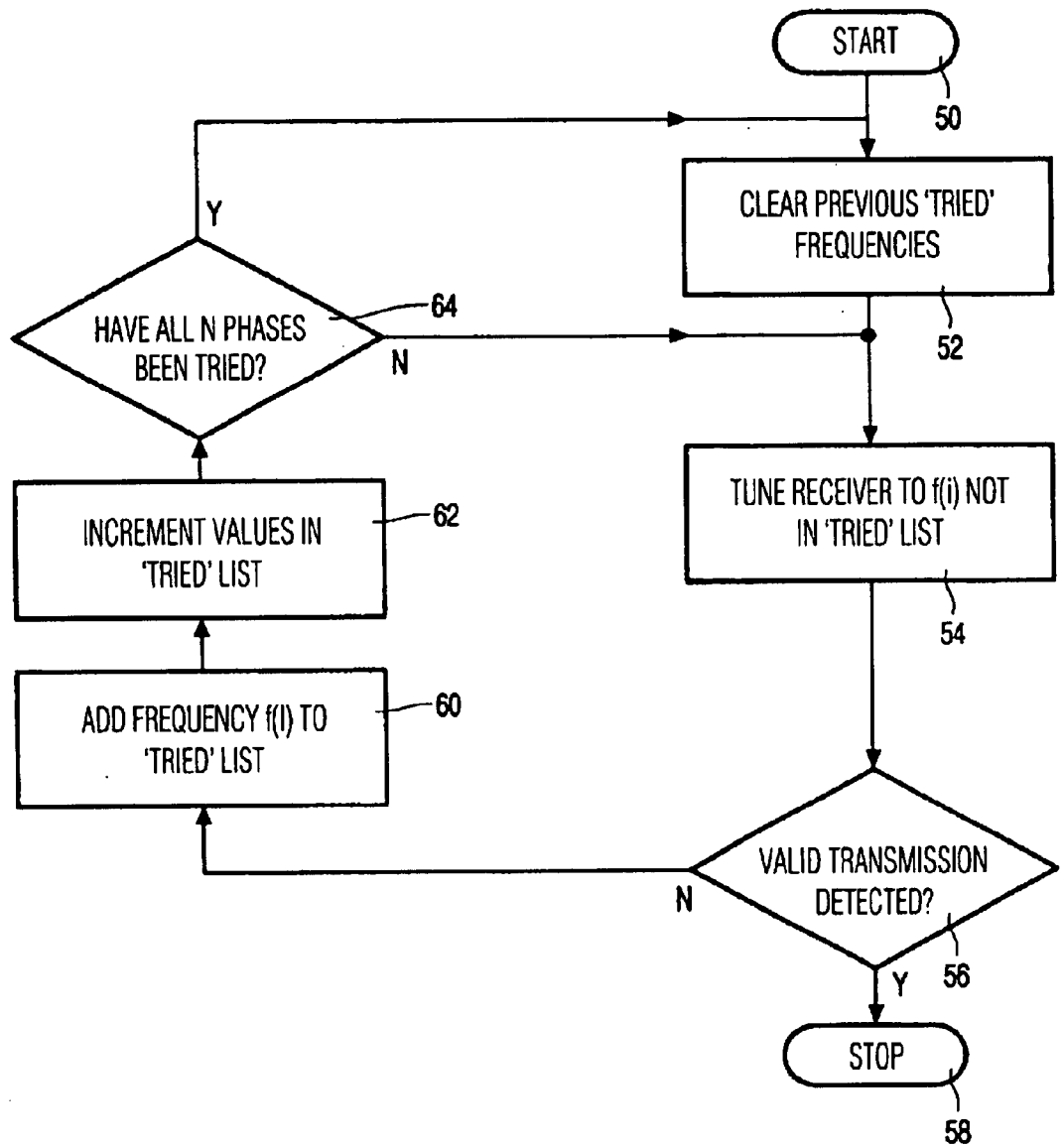
FIG. 5 is a flow chart of the acquisition process.

FIG. 5 illustrates a flow chart of the sequence of operations carried-out under the control of the controller 16 (FIG. 2).

Block 50 indicates initiating the start of the search. Block 52 relates to clearing a store of a "tried" list of frequencies from a previous phase acquisition operation. Block 54 denotes the step of tuning the receiver to a frequency f(i) not in the "tried" list. Block 56 relates to checking of a valid transmission is detected during the hop period. If the answer is yes (Y) then in block 58 the search is terminated because phase acquisition has been achieved. If the answer is no (N), in block 60 the frequency f(i) is added to the "tried" list. In block 62 all the values in the "tried" list are incremented MOD (N) to impose the new constraint values. In block 64 a check is made if all N phases have been tried. If the answer is no (N) the search routine in blocks 54, 56, 60, 62 is repeated. If the answer is yes (Y), the search is terminated or repeated beginning at the block 52.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the design, manufacture and use of frequency hopping systems and receivers therefor and which may be used instead of or in addition to features already described herein.

What is claimed is:

1. A method of frequency acquisition in a frequency hopping system in which a transmitter continuously frequency hops through a predetermined sequence of N frequencies, where N is an integer greater than 2, and in which a tunable receiver stores the so predetermined sequence of N frequencies, the method comprising the receiver tuning to one of said N frequencies and monitoring the selected frequency for a hop period, and if the selected frequency corresponds to the transmitted frequency, assuming that it has frequency acquisition and terminating the search, but if it does not correspond, selecting another of said N frequencies with the exception of the frequency in the hopping sequence adjacent to the previously selected frequency.

2. A method as claimed in claim 1, characterized in that in the event of the another frequency does not correspond to the frequency transmitted in the hop period, the receiver selects a further one of said N frequencies with the exceptions of the frequency in the hopping sequence adjacent the another frequency and of the frequency in the hopping sequence next but one from said one of said frequencies in the hopping sequence, and that if the further one of said N frequencies does not correspond, the cycle is repeated with the receiver selecting each time a yet further one of said N frequencies and incrementing by MOD (N) the frequencies in the unacceptable hopping sequences, until correspondence is noted.

3. A method as claimed in claim 1, characterized in that the selection of said frequencies is done randomly.

4. A method as claimed in claim 1, characterized in that the frequencies are selected in response to received signal strength measurements.

5. A method as claimed in claim 2, characterized in that said one to selected frequency has a frequency f(i) and said another frequency has a frequency f(j) where j≠i+1.

6. A receiver for use in a frequency hopping system in which a transmitter continuously frequency hops through a predetermined sequence of is N frequencies, where N is an integer greater than 2, the receiver comprising N means for storing representations of the frequencies in said predetermined sequence of N frequencies, means for selecting the representations, means responsive to the selection of a representation of one of said N frequencies for tuning the receiver, means for monitoring the selected frequency for a hop period, and if the selected frequency corresponds to the transmitted frequency, assuming that it has frequency acquisition, but if it does not correspond, the selecting means selects a representation of another of said N frequencies with the exception of the frequency in the hopping sequence adjacent to the previously selected frequency.

7. A receiver as claimed in claim 6, characterized in that in the event of the another frequency does not correspond to the frequency transmitted in the hop period, the selecting means selects a further one of said N frequencies with the exceptions of the frequency in the hopping sequence adjacent the another frequency and of the frequency in the hopping sequence next but one from said one of said frequencies in the hopping sequence, and in that if the further one of said N frequencies does not correspond, the selecting means repeats the cycle by selecting each time a yet further one of said N frequencies and incrementing by MOD (N) the frequencies in the unacceptable hopping sequences, until correspondence is noted.

8. A receiver as claimed in claim 6, characterized in that the selection of the representations of said frequencies is done randomly.

9. A receiver as claimed in claim 6, characterized in that the selection of the representations of said frequencies is done in response to received signal strengths measurements.

* * * * *